(12) United States Patent
Pandharipande et al.

(10) Patent No.: US 9,300,394 B2
(45) Date of Patent: Mar. 29, 2016

(54) SENSING AND COMMUNICATION PROTOCOLS FOR SHARED SPECTRUM USAGE IN A RADIO COGNITIVE RELAY SYSTEM

(75) Inventors: Ashish Vijay Pandharipande, Eindhoven (NL); Yang Han, Eindhoven (NL); Ying Wang, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 402 days.

(21) Appl. No.: 13/055,773

(22) PCT Filed: Jul. 16, 2009

(86) PCT No.: PCT/IB2009/053091
§ 371 (c)(1),
(2), (4) Date: Jan. 25, 2011

(87) PCT Pub. No.: WO2010/013164
PCT Pub. Date: Feb. 4, 2010

(65) Prior Publication Data
US 2011/0122808 A1    May 26, 2011

(30) Foreign Application Priority Data
Jul. 30, 2008    (EP) ..................................... 08161398

(51) Int. Cl.
*H04W 16/14* (2009.01)
*H04B 7/26* (2006.01)
(Continued)

(52) U.S. Cl.
CPC .......... *H04B 7/2606* (2013.01); *H04B 7/15585* (2013.01); *H04W 72/1215* (2013.01);
(Continued)

(58) Field of Classification Search
CPC ............ H04B 7/15585; H04B 7/2606; H04W 72/121; H04W 72/1215; H04W 16/14; H04W 24/00; H04W 84/18; H04W 88/04; H04W 88/06
USPC ................. 370/310, 315, 328, 329; 455/63.1, 455/67.11, 67.13, 10
See application file for complete search history.

(56) References Cited

U.S. PATENT DOCUMENTS 7,336,930 B2 *   2/2008  Larsson et al. ............... 455/63.1
2008/0069041 A1 * 3/2008  Tandai et al. ................. 370/329
(Continued)

FOREIGN PATENT DOCUMENTS

| CN | 1826767 A | 8/2006 |
|---|---|---|
| CN | 101222262 A | 7/2008 |

(Continued)

OTHER PUBLICATIONS

S. Sahai et al; "Some Fundamental Limits on Cognitive Radio", Proc. Allerton Conf on Communication, Control, and Computing, Oct. 2004, pp. 1-16.

(Continued)

*Primary Examiner* — Mang Yeung
*Assistant Examiner* — Natali N Pascual Peguero (57) ABSTRACT

The present invention relates to a method, an apparatus and a computer program product for sensing and communicating in transmission systems with shared spectrum usage, which may comprise e.g. a cognitive relay system. The communication between a transmitter and a receiver occurs in two transmission phases via the assistance of a relay. Sensing is performed at the transmitter during the second transmission phase, thus overcoming the need for dedicated slots for sensing.

11 Claims, 4 Drawing Sheets

(51) Int. Cl.
*H04B 7/155* (2006.01)
*H04W 72/12* (2009.01)
*H04W 24/00* (2009.01)
*H04W 84/18* (2009.01)
*H04W 88/04* (2009.01)
*H04W 88/06* (2009.01)

(52) U.S. Cl.
CPC .............. *H04W16/14* (2013.01); *H04W 24/00* (2013.01); *H04W 84/18* (2013.01); *H04W 88/04* (2013.01); *H04W 88/06* (2013.01)

(56) References Cited

U.S. PATENT DOCUMENTS

| | | | |
|---|---|---|---|
| 2008/0166974 | A1 | 7/2008 | Teo et al. |
| 2008/0192686 | A1* | 8/2008 | Cho et al. ................. 370/329 |
| 2008/0194925 | A1* | 8/2008 | Alsafadi et al. ............. 600/301 |
| 2008/0225789 | A1* | 9/2008 | Kim et al. .................. 370/329 |
| 2009/0068965 | A1* | 3/2009 | Faulkner ................... 455/114.2 |

FOREIGN PATENT DOCUMENTS

| | | | |
|---|---|---|---|
| GB | 2398205 A | * | 8/2004 |
| WO | 2004102891 A1 | | 11/2004 |

OTHER PUBLICATIONS

Ashish Pandharipande et al; "Stochastic Spectrum Pool Reassignment for Cognitive Relay Systems", WCNC 2008, IEEE Wireless Communications Networking Conference, Mar. 31, 2008, XP002553746.

Klaus Hueske et al; "Parallel Block Signal Processing in High Speed Wireless Communication Systems", IEEE ISWCS 2007, Info. Proc. Lab, Univ. of Dortmund, DE, pp. 475-479.
Hironobu Hatamoto et al; "Relay-Assisted Re-Transmission Scheme Based on Mutual Information for Wireless Mesh Networks", The 18th Annual IEEE Intnl Symposium on Persona, Indoor and Mobile Radio Communications (PIMRC '07), pp. 1-5.
Klaus Hueske et al; "Optimized Channel Coding Schemes for a Guard Period Free Transmission System", ICASSP 2008, Univ. of Dortmund, Info. Proc. Lab. pp. 2977-2980.
"Federal Communication Commission", FCC 06-156.
"Federal Communication Commission", FCC06-103.
Carl Stevenson; IEEE 802 LOAN/MAN Standards Committee, 802. 22 WG on WRANS.
IEEE 802.15 Wireless Next Generation Standing Committee, IEEE 802.15 WPAN Task Group 6 Body Area Networks (BAN).
Simon Haykin; "Cognitive Radio: Brain-Empowered Wireless Communications", IEEE Journal on Selected Areas in Communications, vol. 23, No. 2, Feb. 2005, pp. 201-220.
Danijela Cabric et al; "Physical Layer Design Issues Unique to Cognitive Radio Systems", 2005 IEEE 16th Intnl Symposium on Personal, Indoor and Mobile Radio Communications, pp. 759-763.
Natasha Devroye et al; "Achievable Rates in Cognitive Radio Channels", IEEE Transactions on Information Theory, vol. 52, No. 5, May 2006, pp. 1813-1827.
Patrick Mitran et al; "On Compoundm Channelwith Side Information at the Transmitter", IEEE Transactions on Information Theory, vol. 52, No. 4, Apr. 2006, pp. 1745-1755.
Aleksandar Jovicic et al; "Cognitive Radio: An Information-Theoretic Perspective", IEEE Transactions on Information Theory, vol. 55, No. 9, Sep. 2009, pp. 3945-3958.
Ganesan et al, "Spatiotemporal Sensing in Cognitive Radio Networks", IEEE Journal on Selected Areas in Communications, vol. 26, No. 1, Jan. 2008, p. 5-12.

* cited by examiner

SENSING AND COMMUNICATION PROTOCOLS FOR SHARED SPECTRUM USAGE IN A RADIO COGNITIVE RELAY SYSTEM

FIELD OF THE INVENTION

The present invention relates to an apparatus, a system, a method and a computer program product for transmitting and receiving signals of at least two transmission systems which at least partly operate in the same spectrum. Among such transmission systems are e.g. cognitive relay systems with flexible spectrum usage models.

BACKGROUND OF THE INVENTION

The explosion of new wireless technologies and applications demands prudent use of the limited, usable radio spectrum. This has fostered regulatory changes to move from the current fixed spectrum allocation policies to flexible spectrum usage models. In the USA, the Federal Communications Commission (FCC) which is charged with regulating interstate and international communications by radio, television, wire, satellite and cable, is for instance taking steps towards adopting policies permitting the use of low-power portable devices in the VHF-UHF spectrum. Regulatory steps are also moving in a direction of permitting more secondary spectrum available for medical devices and body sensor networks. Interest has also been growing in the UK and other EU counties to adopt innovative spectrum sharing models where licensed bands allocated to primary systems are opened for secondary usage.

One of the requirements for operation on secondary spectrum basis is that the secondary system transmission does not cause any harmful interference to the primary systems. This requirement is typically met by spectrum sensing and operating on spectral regions where primary systems are not found to be active. Spectrum sensing may involve detection of the presence of transmissions from primary systems.

The benefits of cooperation and relaying in wireless systems are widely recognized, and also part of upcoming standards (e.g., IEEE 802.15 WPAN Task Group on Body Area Networks). These techniques are known to lead to better system performance and used for example for range extension, improving error rates etc. Cognitive wireless systems based on cooperative relaying will thus be of natural interest in such future wireless standards.

A cognitive network where two source-destination links, a primary link and a secondary link, share the same spectral resource has been recently investigated in an information theoretic study presented in N. Devroye, P. Mitran and V. Tarokh, "Achievable rates in cognitive radio," IEEE Trans. Inform. Theory, vol. 52, no. 5, pp. 1813-1827, May 2006, and A. Jovicic and P. Viswanath, "Cognitive radio: an information-theoretic perspective". In these references, a cognitive transmitter is assumed to have perfect prior information about the signal transmitted by a primary transmitter (see also P. Mitran, N. Devroye and V. Tarokh, "On compound channels with side information at the transmitter," IEEE Trans. Inform. Theory, vol. 52, no. 4, pp. 1745-1755, April 2006, the entire content of which is incorporated herein by reference). However, imperfect information on the radio environment (e.g., on the primary activity) at the cognitive transmitter (or node) is expected to be a major impediment to the implementation of the cognitive principle, as described in more detail in A. Sahai, N. Hoven and R. Tandra, "Some fundamental limits on cognitive radio," in Proc. Allerton Conference on Communication, Control, and Computing, October 2004. Moreover, traffic dynamics at the primary are of great importance in defining the performance of cognitive radio, but random packet arrival cannot be easily incorporated in a purely information theoretic analysis.

Figure 1:
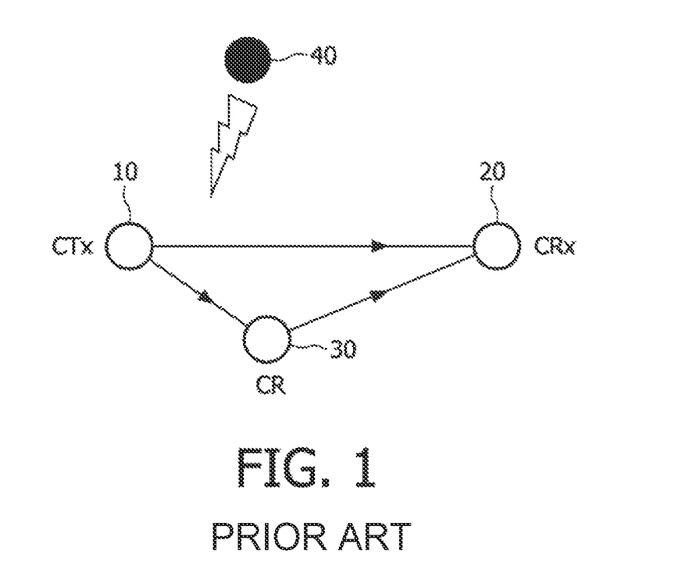
FIG. 1 shows a schematic network topology of a cognitive relay system.

FIG. 1 shows a schematic architecture of a cognitive wireless relay system topology, where a cognitive system transmitter (CTx) 10 transmits data to a cognitive system receiver (CRx) 20 with the aid of a cognitive system relay (CR) 30. This cognitive system operates on secondary sharing basis on a certain portion of spectrum that is licensed to certain primary systems which include a primary system transmitter 40.

Figure 2:
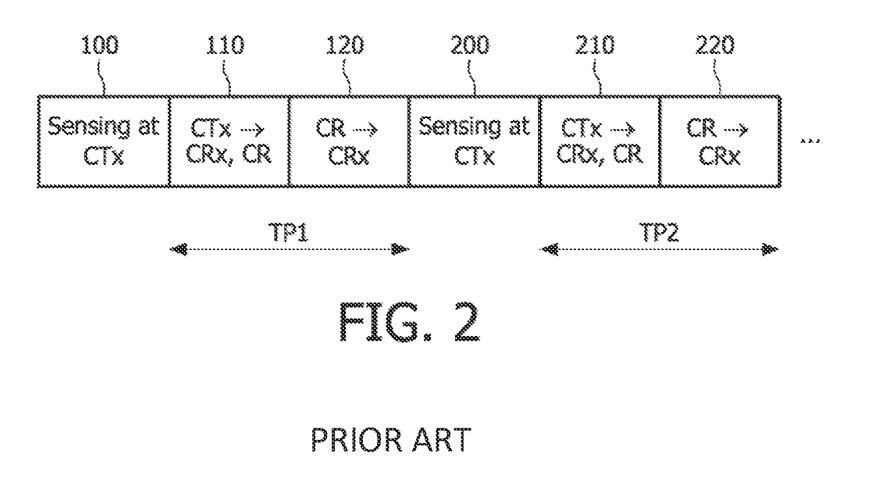
FIG. 2 show a conventional sensing and communication procedure.

FIG. 2 shows a schematic timing schedule of a naïve sensing and communication protocol which may be employed in a system according to FIG. 1.

Sensing is performed by the CTx 10 periodically in steps 100, 200, and so on. If no primary system transmissions are present, transmission is done in two phases of respective successive transmission periods TP1, TP2, and so on. In the first phase (steps 110, 210, . . . ), the CTx 10 transmits data to the CRx 20, which is also received at CR 30. The CR 30 performs some signal processing on the received data (for e.g., amplification, decoding, etc.) and forwards or broadcasts it to the CRx 10 in the second phase (steps 120, 220, . . . ).

However, periodic sensing is required to monitor the presence/reappearance of primary signal transmissions. As can be seen from FIG. 2, this periodic sensing in steps 100, 200, . . . is an overhead and reduces information throughput significantly. It also has an implication on latency requirements and can be a critical issue in delay-sensitive applications.

SUMMARY OF THE INVENTION

It is an object of the present invention to provide a more efficient interference management approach by which information throughput can be increased.

This object is achieved by an apparatus as claimed in claim 1, by a method as claimed in claim 6, by a system as claimed in claim 10, and by a computer program product as claimed in claim 11.

Accordingly, sensing at the transmitter side can be performed during the second transmission phase, thus overcoming the need for dedicated slots for sensing. A dedicated sensing slot is thus only required during an initial transmission setup, reducing the additional overhead that is incurred by a periodic sensing slot.

The proposed apparatus may be implemented as processor devices, modules, chips, chip sets or circuitries provided in a network node or station. A processor may be controlled by a computer program product comprising code means for performing the steps of the claimed method when run on a computer or processor device.

According to a first aspect, the first and second transmission systems may be primary and secondary systems, respectively, with flexible spectrum usage.

According to a second aspect which may be combined with the first aspect, the second transmission system may be a cognitive relay system.

According to a third aspect which may be combined with any one of the above first and second aspects, the transmitter and the interference processor may be adapted to perform the transmission and the sensing in a periodical manner.

According to a fourth aspect which may be combined with any one of the above first to third aspects, the apparatus may be a medical device and the relayed version may be received from a medical hub.

Further advantageous developments are defined in the dependent claims.

BRIEF DESCRIPTION OF THE DRAWINGS

The present invention will now be described based on various embodiments with reference to the accompanying drawings in which.

DETAILED DESCRIPTION OF EMBODIMENTS

In the following, embodiments of the present invention are described on the basis of an exemplary cognitive relay system as shown in FIG. 1.

The embodiments can be implemented for instance in a cognitive wireless relay system topology as shown in FIG. 1, where the cognitive system transmitter (CTx) 10 transmits data to a cognitive system receiver (CRx) 20 with the aid of a cognitive system relay (CR) 30, and where the relay system operates on a secondary sharing basis of a certain portion of spectrum that is licensed to certain primary systems. An example of such a cognitive relay system is one in which the CTx 10 may be a medical device, the CR 30 may be a medical hub, and the CRx 30 may be another medical hub or a central medical processor.

In various embodiments, a sensing and communication protocol for cognitive relay systems or other spectrum sharing systems is provided, wherein the transmission is carried in two phases, with the CTx 10 transmitting data in the first phase where it is received at the CRx 30 and CR 20. An intermediate processing is performed at the CR 20 in which the data is processed, and then broadcast in the second phase. Then, in the second phase, the CTx 10 performs sensing after canceling out the interference caused by transmission from the CR 20.

Figure 3:
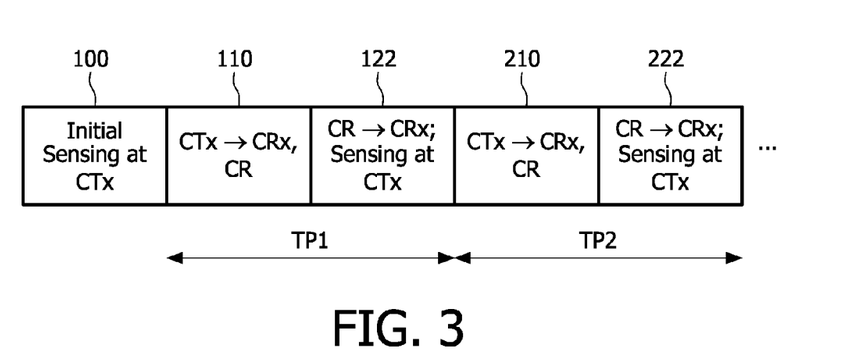
FIG. 3 shows a sensing and communication procedure according to an embodiment.

FIG. 3 shows a sensing and communication procedure of a proposed protocol according to an embodiment. An initial sensing is performed at the CTx 10 during link setup in a first step 100. If no primary system transmissions are detected, e.g. by an interference processor or a central multi-purpose processor provided at the CTx 10, a two-phase transmission is set up. In the first phase (steps 110, 210, ... in FIG. 3), the CTx 10 transmits data to the CRx 30, which is also received at the CR 20. Then, the CR 20 performs some signal processing on the received data (e.g., amplification, or decoding, etc.). The processed data is broadcast and thus forwarded to the CRx 30 in the second phase (steps 122, 222, ... ). This data is also received at the CTx 10, which can now perform sensing during the second phase to determine whether or not a primary system transmission has appeared. The received signal at the CTx 10 is a combination of primary signals (if such exist), the signal broadcast from the CR 20 and noise. Since the CTx 10 knows a priori the signal transmitted from the CR 20, it can cancel out or at least suppress this signal component before or while performing detection of primary signals.

Thus, a dedicated sensing slot is only required during an initial transmission setup (step 100), so that the additional overhead that is incurred by a periodic sensing slot.

In the following, a specific implementation of the protocol with amplification-based processing at the CR 20 is described.

Channel coefficients of the transmission links CTx→CRx, CTx→CR, CR→CRx, and CR→CTx, are denoted as $h_1$, $h_2$, $h_3$, and $h_4$, respectively. These coefficients represent wireless fading coefficients and can be typically modeled as Rayleigh fading. Additionally, respective additive white Gaussian noise (AWGN) at the CTx 10, the CRx 30, and the CR 20 is denoted as $n_1$, $n_2$ and $n_3$ respectively, with variance $\sigma^2$. It is further assumed that the transmit powers at the CTx 10 and the CR 20 are the same and equal to P. These assumptions are done for the purpose of simplifying the explanations, but are not intended to limit the scope of the embodiments. The signal components of the primary system (if a primary system is transmitting) received at the CTx 10, the CRx 30, and the CR 20 in the i th transmission phase are denoted as $X_{si}$, $X_{di}$, and $X_{ri}$, respectively, where $i \in \{1,2\}$.

Figure 4:
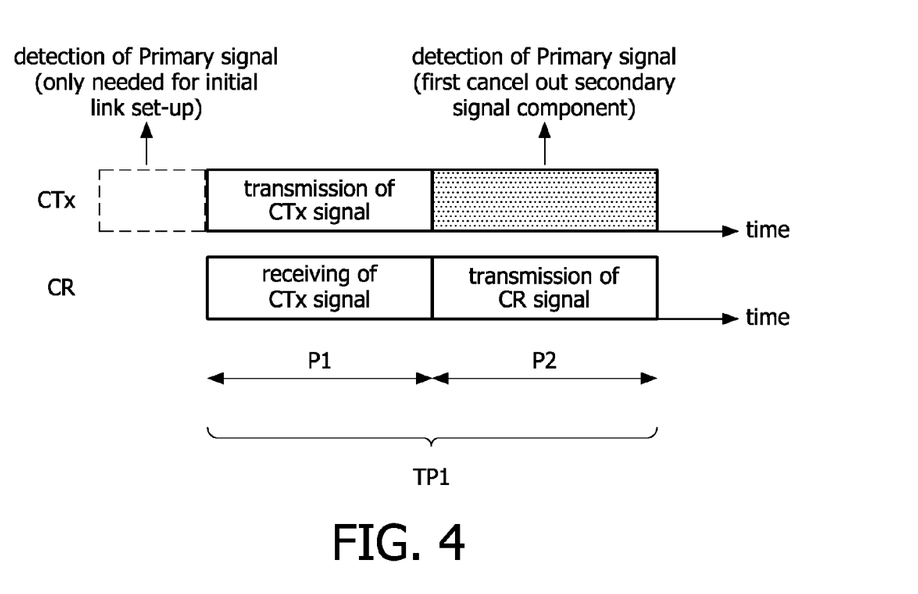
FIG. 4 shows a timing diagram of the sensing and communication procedure according to the embodiment.

FIG. 4 shows a timing diagram of the sensing and communication procedure according to the embodiment, wherein the upper time-dependent diagram relates to the operation of the CTx 10 and the lower time diagram relates to the operation of the CR 20. The CTx 10 first performs an initial sensing which is only needed for initial link set-up. If no signal of primary system is detected, a two-phase cognitive transmission is set up. In the first transmission phase P1, a secondary signal $x_c$ is transmitted by the CTx 10. The signal received at the CRx 30 is given as $$y_{d1} = \sqrt{P} h_1 x_c + X_{d1} + n_2 \qquad (1)$$

and the signal received at the CR 20 in first transmission phase is given as $$y_{r1} = \sqrt{P} h_2 x_c + X_{r1} + n_3. \qquad (2)$$

It is assumed here that primary system transmissions do not vary rapidly, i.e. there are no primary transmitters (e.g. the primary transmitter 40 of FIG. 1) transmitting in the first transmission phase, so that $X_{d1}=0$ and $X_{r1}=0$. This assumption again is not intended to affect the scope of the embodiments. If primary systems are active, they may suffer a certain amount of interference over a small interval of time, which corresponds to the length of the first transmission phase P1. After the reception in the first transmission phase P1, if no signal component containing the secondary signal component $x_c$ is detected, the CR 20 simply keeps silent until it receives new transmissions from the CTx 10. The secondary signal component may be detected based on known signal or data portion, such as pilots and/or preambles. Otherwise, the CR 20 normalizes the received signal and then forwards it to the CRx 10. The signal received at the CRx 30 in the second transmission phase P2 is then given as $$y_{d2} = h_3 g y_{r1} + X_{d2} + n_2 \qquad (3)$$
$$= \sqrt{P} h_2 h_3 g x_c + h_3 g n_3 + X_{d2} + n_2$$

where $$g = \sqrt{\frac{P}{P\gamma_2 + \sigma^2}}$$

and $\gamma_2 = |h_2|^2$. After reception in the second transmission phase P2, the CRx 30 can combine $y_{d1}$ and $y_{d2}$ to decode $x_c$.

The signal received at CTx 10 in the second transmission phase P2 is given as $$y_s = h_4 g y_{r1} + X_{s2} + n_1 \quad (4)$$
$$= \sqrt{P} h_2 h_4 g x_c + h_4 g n_3 + X_{s2} + n_1.$$

As the CTx 10 has perfect (or, close to perfect) knowledge of the respective channel state information (e.g. obtained by training-based channel estimation using the known signal components (e.g. pilot/preamble) of the cognitive system and/or feedback from the CR 20), the self-interference component $\sqrt{P} h_2 h_4 g x_c$ can be cancelled out to obtain $$y_s' = h_4 g n_3 + X_{s2} + n_1 \quad (5)$$

Then, the CTx 10 performs the detection of $X_{s2}$ with $y_s'$. If $X_{s2}$ is not detected, the next two-phase transmission continues. Otherwise, the CTx 10 may keep silent and may scan the channel periodically until the channel is determined to be clear of the signal of primary system and then a new cognitive transmission can be set up.

Figure 5:
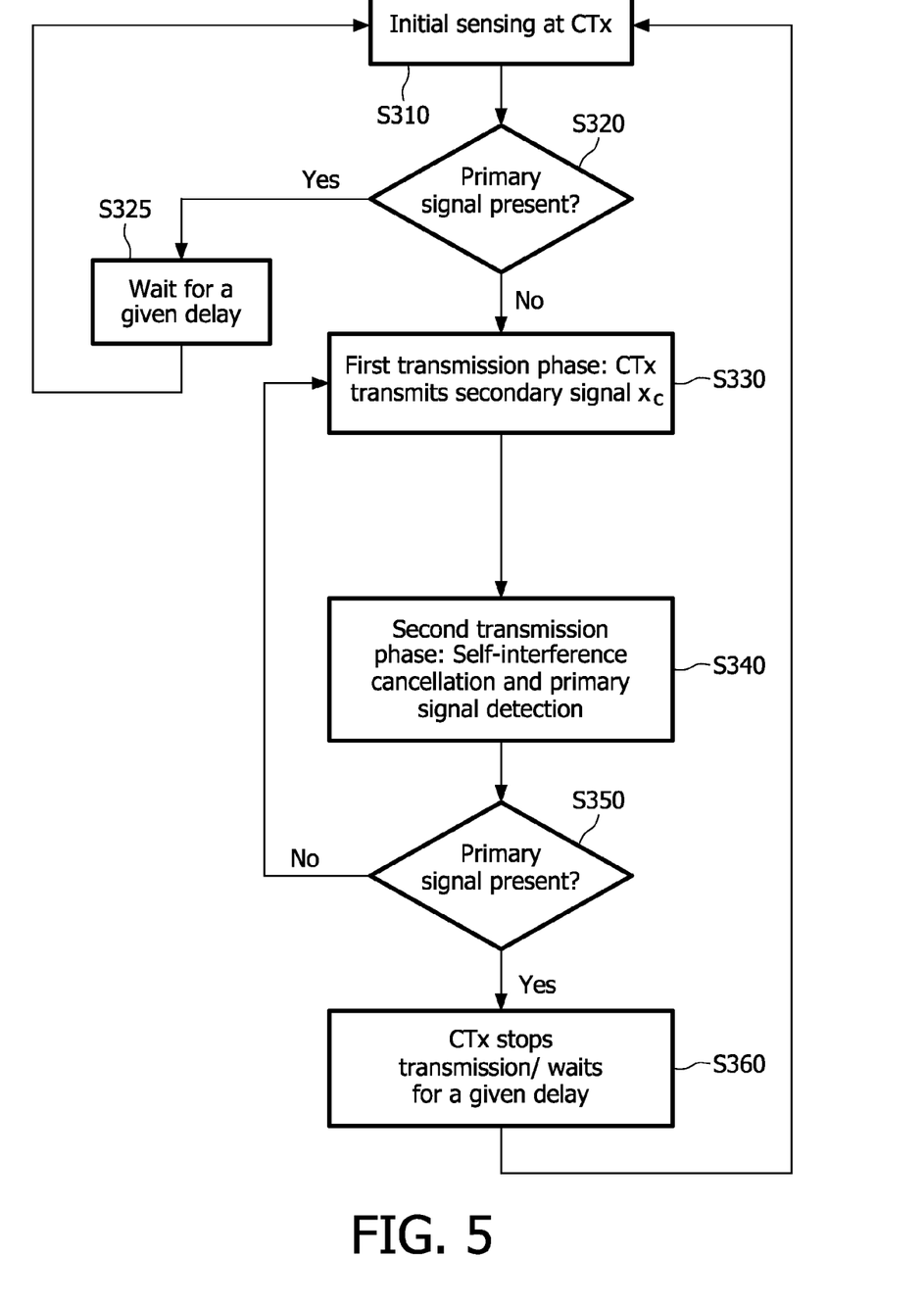
FIG. 5 shows a schematic flow diagram of a transmitter-side sensing and communication processing according to an embodiment.

FIG. 5 shows a schematic flow diagram of an interference control mechanism or procedure for the CTx 10.

In step S310 an initial sensing is performed one at the CTx 10. Then, it is checked in step S320 whether the sensing operation indicates that a primary signal has been detected or is present. If a primary signal is present, the procedure branches off to step S325 and waits for a given delay period which may be determined by starting a counter or timer or respective operation. Otherwise, if it has been determined that a primary signal is not present, the procedure proceeds to step S330 and a first transmission phase of a transmission period is initiated and the CTx 10 transmits a secondary signal $x_c$. Thereafter, a second transmission phase of the transmission period is initiated in step S340, where the CTx 10 performs self-interference cancellation based on the known signal parameters of the transmission in step S330 and additionally performs primary signal detection. Then, it is checked in step S350 whether a primary signal has been received or is present. If a primary signal is not present, the procedure branches off and jumps back to step S330 in order to start a new first phase of a new transmission period. Otherwise, if it has been determined that a primary signal is present, the procedure proceeds to step S360 and the CTx 10 stops secondary transmission and waits for a given delay period which may be determined by starting a counter or timer or respective operation.

Figure 6:
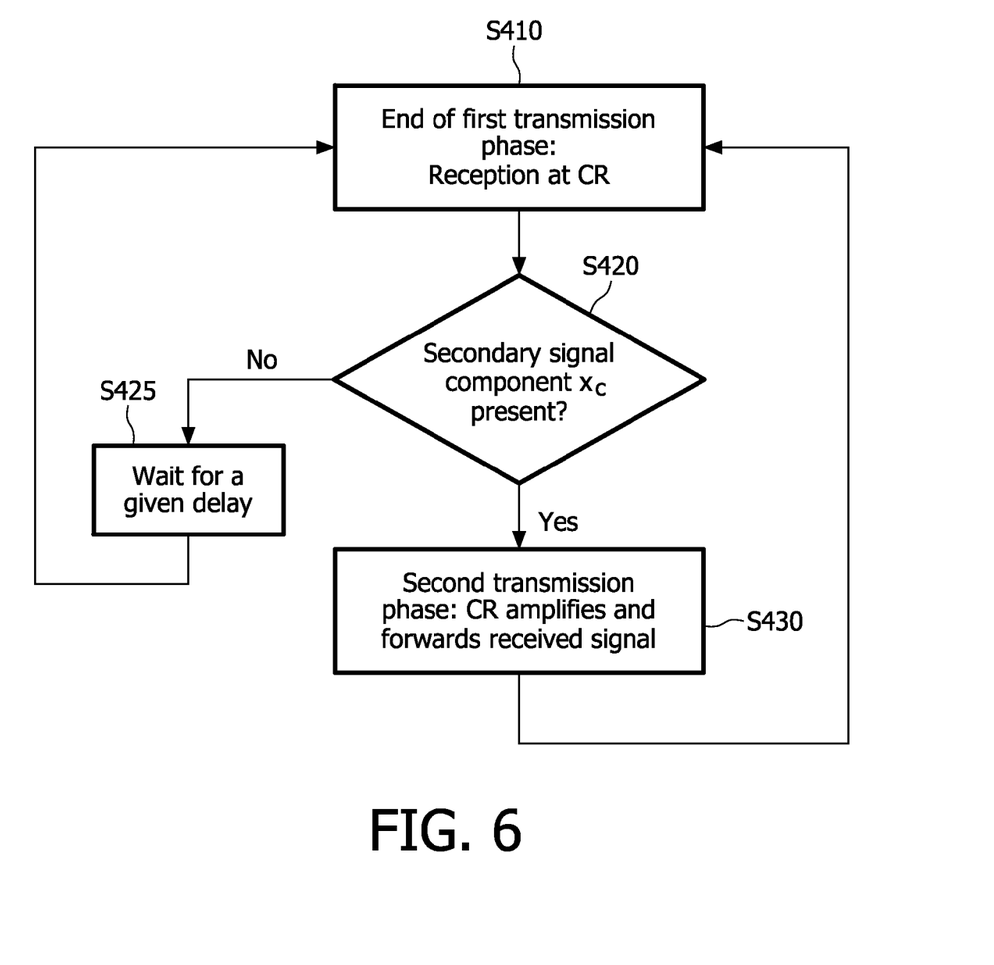
FIG. 6 shows a schematic flow diagram of a relay-side sensing and communication processing according to an embodiment.

FIG. 6 shows a schematic flow diagram of a relay mechanism or procedure for the CR 20 which is linked in time to the end of step S330 of FIG. 5. I.e., when the first transmission phase has ended, the CR 20 initiates a reception operation in step S410. In the following step S420, it is checked in step S420 whether a secondary signal component $x_c$ has been received or is present. If a secondary signal is determined to be not present, the procedure branches off to step S425 and waits for a given delay period which may be determined by starting a counter or timer or respective operation. Otherwise, if it has been determined in step S420 that a secondary signal is present, the procedure proceeds to step S430 and a second transmission phase of a transmission period is initiated and the CR 20 amplifies and forwards or broadcasts the received secondary signal.

The above embodiments of the CTx 10 and the CR 20 can be provided in respective radio nodes (e.g. mesh point, mesh access point, mesh portal, or any other type of radio node) or other wireless-type network nodes. The embodiments can be implemented based on discrete hardware circuits or circuitries, a chip, a chip set, a module or a software-controlled processor or computer device where the functions of FIGS. 5 and 6 may be provided as software programs or routines.

In summary, a method, an apparatus and a computer program product have been described for sensing and communicating in transmission systems with shared spectrum usage, which systems may comprise e.g. a cognitive relay system. The communication between a transmitter and a receiver occurs in two transmission phases via the assistance of a relay. Sensing is performed at the transmitter during the second transmission phase, thus overcoming the need for dedicated slots for sensing.

It is noted that the present invention is not restricted to the above embodiments and can be used for any network environment which allows shared spectrum usage by at least two transmission systems. Although the system and associated protocols have been described for cognitive relay systems operating on secondary spectrum sharing basis in licensed spectrum, the same can be extended for the purpose of any type of interference management. The invention applies with the cognitive relay system replaced by a first transmission system and the primary system replaced by a second transmission system, where the first transmission system tries to avoid interference from the second transmission system, and operates in the same spectrum. Such a situation arises for example in unlicensed bands where interference management is a critical issue. The proposed invention applies for example to devices of wireless systems operating on secondary basis a in licensed spectrum (e.g., portable devices, medical devices, body sensors etc.).

Furthermore, the present invention may be applied e.g. to enhancements based on the upcoming IEEE 802.22 standard on wireless regional area networks. Future standardization is expected to be targeted towards connectivity applications (e.g., portable devices) in the UHF (Ultra High Frequency) bands and/or television white space where the proposed methods would be of great interest. The proposed interference management can be more generally applied to a wide class of cognitive wireless systems that may be subject to future standardization. One possibility is medical devices and body sensor networks, as described in IEEE 802.15 WPAN Task Group on Body Area Networks, that may be based on a partly allocated spectrum on a secondary sharing basis.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. A single processor or other unit may fulfill the functions of several items recited in the claims. The mere fact that certain measures are recited in mutually different dependent claims does not indicate that a combination of these measures cannot be used to advantage. A computer program used for controlling processor to perform the steps of FIGS. 5 and 6 and thus the claimed features may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. An apparatus for transmitting and receiving signals in a spectrum shared by first and second transmission systems, said apparatus comprising:
   a transmitter:
      transmitting a signal of said second transmission system in a first phase of a signal transmission period, when an initial sensing operation of said apparatus indicates that a primary signal of said first transmission system has not been received; and an interference processor:
receiving, in a second phase, a relayed version of said signal transmitted in said first phase of said signal transmission period;
canceling interference caused by receipt of said relayed version of said signal transmitted in said first phase of said signal transmission period by removing said signal transmitted in said first phase of said signal transmission period from said received relayed version of said signal transmitted in said first phase of said signal transmission period; and the transmitter:
performing a sensing operation of said primary signal in said second phase of said signal transmission period while canceling out said interference caused by receipt of said relayed version of said signal transmitted in said first phase; and
transmitting another signal in a first phase of a next signal transmission period when said sensing operation indicates that said primary signal has not been received; and
delaying, by a known period of time, transmission of said another signal in said first phase of said next signal transmission period when said sensing operation indicates that said primary signal has been received.

2. The apparatus according to claim 1, wherein said first and second transmission systems are primary and secondary systems, respectively, with flexible spectrum usage.

3. The apparatus according to claim 2, wherein said second transmission system is a cognitive relay system.

4. The apparatus according to claim 1, wherein said transmitter and said interference processor are adapted to perform said transmission and said sensing in a periodical manner.

5. The apparatus according to claim 1, wherein said apparatus is a medical device and said relayed version is received from a medical hub.

6. A method for transmitting and receiving signals in a spectrum shared by first and second transmission systems, said method comprising:
transmitting a signal of said second transmission system in a first phase of a signal transmission period, when an initial sensing operation indicates that a primary signal of said first transmission system has not been received;
receiving, in a second phase of said signal transmission period, a relayed version of said signal transmitted in said first phase of said signal transmission period; and
canceling interference caused by receipt of said relayed version of said signal transmitted in said first phase of said signal transmission period by removing said signal transmitted in said first phase of said signal transmission period from said received relayed version of said signal transmitted in said first phase of said signal transmission period;
performing a sensing operation of said primary signal in a second phase of said signal transmission period while canceling out interference caused by receipt of said relayed version of said signal transmitted in said first phase;
transmitting another signal in a first phase of a next signal transmission period when said sensing operation indicates that said primary signal has not been received; and
delaying, by a known period of time, transmission of said another signal in said first phase of said next signal transmission period when said sensing operation indicates that said primary signal has been received.

7. The method according to claim 6, wherein said first and second transmission systems are primary and secondary systems, respectively, with flexible spectrum usage.

8. The method according to claim 7, wherein said second transmission system is a cognitive relay system.

9. The method according to claim 6, wherein transmission and sensing is performed in a periodical manner.

10. A system for transmitting and receiving signals in a spectrum shared by first and second transmission systems, said system comprising:
at least one network node and
at least one relay node, said relay node:
receiving a signal transmitted by the at least one network node in a first phase; and
broadcasting a relayed version of said signal in a second phase, wherein said at least one network node:
receives the relayed version of said signal; and
cancels interference caused by the relayed version of said signal by removing said signal transmitted in said first phase of said signal transmission period from said received relayed version of said signal transmitted in said first phase of said signal transmission period;
performs a sensing operation of a primary signal associated with the first transmission system in a second phase while canceling out interference caused by receipt of said relayed version of said signal transmitted in said first phase; and
transmits another signal in a first phase of a next signal transmission period when said sensing operation indicates that said primary signal has not been received; and
delays, by a known period of time, transmission of said another signal in said first phase of said next signal transmission period when said sensing operation indicates that said primary signal has been received.

11. A computer program product, stored on a non-transitory computer readable medium, said program product comprising code, which when run on a computer causes the computer to:
transmit a signal of a second transmission system in a first phase of a signal transmission period when a primary signal associated with a first transmission system is not detected;
receive, in a second phase of said signal transmission period, a relayed version of said signal transmitted in said first phase of said signal transmission period;
cancel interference caused by receipt of said relayed version of said signal transmitted in said first phase of said signal transmission period by removing said signal transmitted in said first phase of said signal transmission period from said received relayed version of said signal transmitted in said first phase of said signal transmission period;
perform a sensing operation of said primary signal associated with the first transmission system in said second phase of said signal transmission period while canceling out interference caused by receipt of said relayed version of said signal transmitted in said first phase;
transmit another signal in a first phase of a next signal transmission period when said sensing operation indicates that said primary signal has not been received; and delay, by a known period of time, transmission of said another signal in said first phase of said next signal transmission period when said sensing operation indicates that said primary signal has been received.

* * * * *